US008699752B2

(12) United States Patent
Huang (10) Patent No.: US 8,699,752 B2
(45) Date of Patent: Apr. 15, 2014

(54) ADAPTIVE CROSS PARTITION FOR LEARNING WEAK CLASSIFIERS

(75) Inventor: Chang Huang, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 200 days.

(21) Appl. No.: 13/441,925

(22) Filed: Apr. 9, 2012

(65) Prior Publication Data

US 2013/0094701 A1 Apr. 18, 2013

Related U.S. Application Data

(60) Provisional application No. 61/540,612, filed on Sep. 29, 2011.

(51) Int. Cl.
*G06K 9/00* (2006.01)
*G06T 15/00* (2011.01)

(52) U.S. Cl.
USPC ............................ 382/103; 382/291; 345/419

(58) Field of Classification Search
CPC .............. G06K 9/00; G06K 9/46; G06K 9/62
USPC ......... 382/100, 103, 106–107, 168, 170, 173, 382/181, 199, 209, 224, 232, 254, 274, 276, 382/284–291, 305, 312, 190, 159, 118; 345/419, 589
See application file for complete search history.

(56) References Cited

U.S. PATENT DOCUMENTS 7,202,873 B2 * 4/2007 Akahori ........................ 345/589
7,899,253 B2 * 3/2011 Porikli et al. ................. 382/190
8,457,391 B2 * 6/2013 Ai et al. ........................ 382/159
2004/0179719 A1 * 9/2004 Chen et al. .................... 382/118
2012/0069003 A1 * 3/2012 Birkbeck et al. ............. 345/419

OTHER PUBLICATIONS

E. P. Xing, A. Y. Ng, M. I. Jordan, and S. Russell. Distance metric learning, with application to clustering with side-information. NIPS, 2002.
A. Bar-Hillel, T. Hertz, N. Shental, and D.Weinshall. Learning distance functions using equivalence relations. ICML, 2003.
S. C. H. Hoi,W. Liu, M. R. Lyu, andW.-Y. Ma. Learning distance metrics with contextual constraints for image retrieval. CVPR, 2006.
R. A. Fisher. The use of multiple measurements in taxonomic problems. Annual of Eugenics, 1936.
J. V. Davis, B. Kulis, P. Jain, S. Sra, and I. S. Dhillon. Information-theoretic metric learning. ICML, 2007.
J. Goldberger, S. Roweis, G. Hinton, and R. Salakhutdinov. Neighbourhood components analysis. NIPS, 2005.
K. Q. Weinberger, J. Blitzer, and L. K. Saul. Distance metric learning for large margin nearest neighbor classification. NIPS, 2005.
A. Globerson and S. Roweis. Metric learning by collapsing classes. NIPS, 2005.

* cited by examiner

*Primary Examiner* — Seyed Azarian
(74) *Attorney, Agent, or Firm* — Joseph Kolodka; Bao Tran (57) ABSTRACT

Systems and methods are disclosed to perform object detection for images from an image sensor by reusing a 1-dimensional feature from a previously learned weak classifier and selecting a new feature to construct a 2-dimensional feature space; and cross partitioning the 2-dimensional space to learn optimal outputs for instances in each domain within a boosting framework.

19 Claims, 7 Drawing Sheets

ADAPTIVE CROSS PARTITION FOR LEARNING WEAK CLASSIFIERS

This application claims priority to Provisional Ser. No. 61/540,612 filed Sep. 29, 2011, the content of which is incorporated by reference.

BACKGROUND

The present invention relates to learning for weak classifiers.

Object detection refers generally to a process to locate objects of interest (e.g., faces and pedestrians) in images and videos. Given a testing images, an object detector searches all possible positions for existence of targets.

Object detection is essentially a classification problem. A technique called boosted cascade has been quite effective in this task due to its high accuracy and efficiency. This classification model combines a series of less accurate yet very efficient "weak" classifiers to constitute a highly accurate "strong" one to distinguish object patterns from background ones.

Conventional systems have selected a suitable threshold to divide a 1-D Haar-like feature into two sub-regions, which can only roughly distinguish samples of different categories. Other conventional approaches have used a much finer partition for each 1-D feature to mitigate this problem; however, this partition is defined beforehand to produce sub-regions of equal width, which fails in adapting to the distribution of training samples and its variation during boosting procedure. Yet other systems have achieved joint partition of multiple-dimension feature space by binary partition of each feature space, these partitions are learned sequentially, purely supervised, and no features are shared between weak classifiers.

Compared to weak parametric models, weak non-parametric models such as decision stumps or trees have been broadly adopted in a number of object detection systems due to their simplicity and flexibility. In certain systems, a weak classifier is simply a decision stump upon a 1-dimensional Haar-like rectangular feature. This has been extended to multi-stump weak classifiers where the system partitions the 1-dimensional Haar-like feature into multiple sub-regions of equal width instead of a binary partition given by the decision stump. In other known systems, joint Haar-like feature based weak classifiers concatenate binary decision stumps over several 1-dimensional Haar-like features to achieve similar multiple sub-region partition; both compute optimal outputs for each sub-regions respectively.

SUMMARY

In one aspect, systems and methods are disclosed to perform object detection for images from an image sensor by reusing a 1-dimensional feature from a previously learned weak classifier and selecting a new feature to construct a 2-dimensional feature space; and cross partitioning the 2-dimensional space to learn optimal outputs for instances in each domain within a boosting framework.

In another aspect, systems and methods are disclosed to perform object detection for images from an image sensor by reusing a 1-dimensional feature from a previously learned weak classifier and selecting a new feature to construct a 2-dimensional feature space; and cross partitioning the 2-dimensional space to learn optimal outputs for instances in each domain within boosting framework.

In one embodiment, a weak classifier is trained through four steps: 1) reuse the 1-dimensional feature of a previously learned weak classifier (if one exists) and select a new feature for the current one so as to construct a 2-dimensional feature space. 2) cross partition the 2-dimensional space to obtain a large amount of small block-wise regions, which have uneven width/height but approximately uniform distribution of training samples weighted by boosting process. 3) aggregate small blocks into larger ones across both dimensions while as much discriminability as possible. 4) learn optimal outputs for instances in each block-wise area independently for the boosting process.

Advantages of the preferred embodiments may include one or more of the following. The system improves computational efficiency by sharing features between consecutive weak classifiers in the sequential detector model. It is also capable of adapting to varying distribution of training samples due to weight updating mechanism of the boosting process. As a result, the boosted cascade detection system achieves higher detection accuracy as well as less computational time. The system enables feature sharing and the crucial cross partition is obtained by both unsupervised learning and supervised learning, unlike conventional systems with partitions over 1-D feature space.

DESCRIPTION

Figure 1:
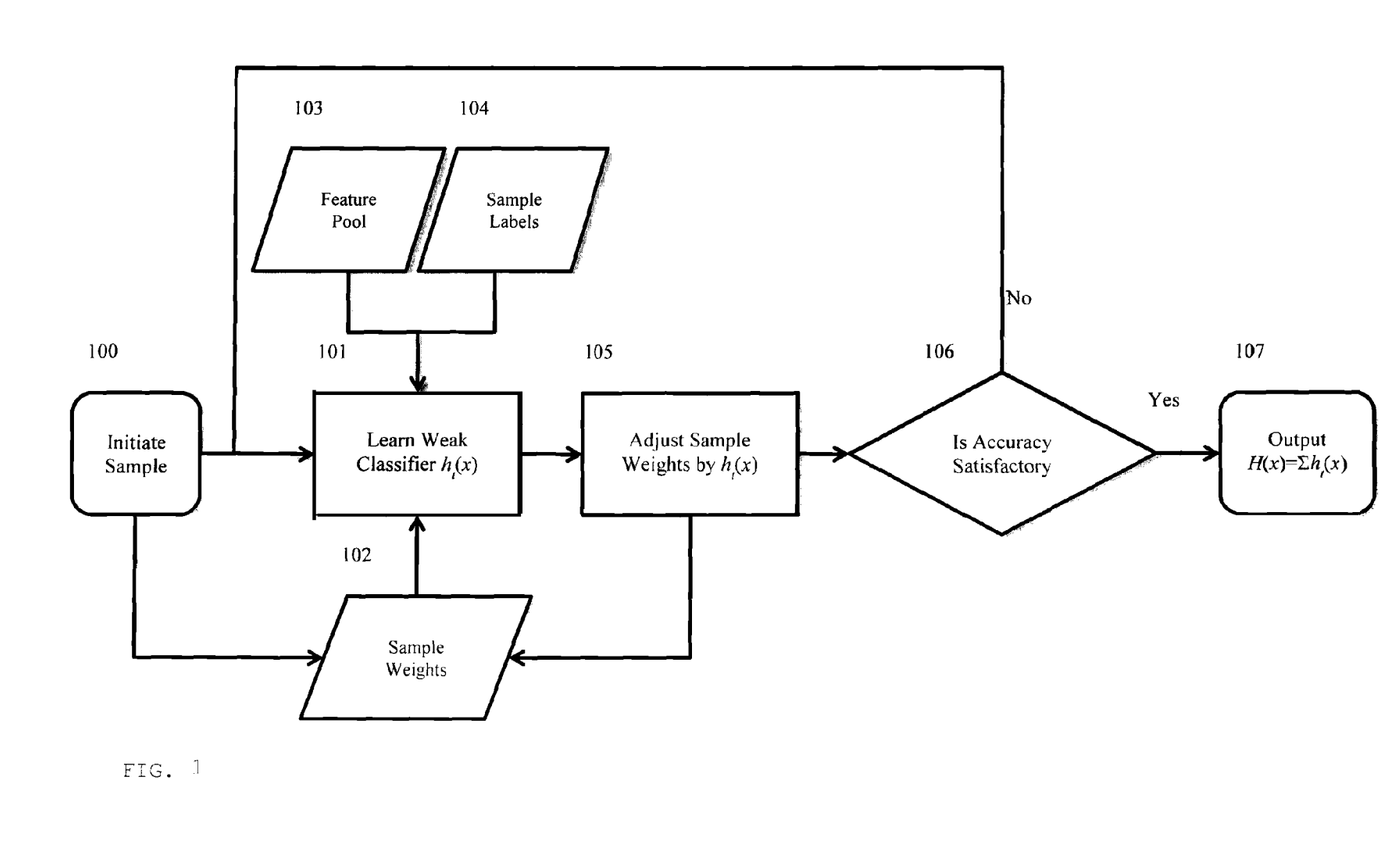
FIG. 1 illustrates a general working flow of an exemplary boosting process.

FIG. 1 illustrates a general working flow of an exemplary boosting process. The process initiates training samples (100) by assigning uniform weights to each of them. After that, the process trains a weak classifier $h_t(x)$ 101 based on weights 102 and labels 104 of training samples as well as a feature pool 103, which roughly predicts the category of any input instance x. The process then adjusts the sample weights 105 according to the prediction results to emphasize incorrectly classified ones in learning of successive weak classifiers. This process is repeated until training samples can be accurately classified (106). Finally, the boosting process outputs a linear combination of weak classifiers 107, $H(x)=\Sigma_t h_t(x)$, as a desired strong classifier.

Figure 2:
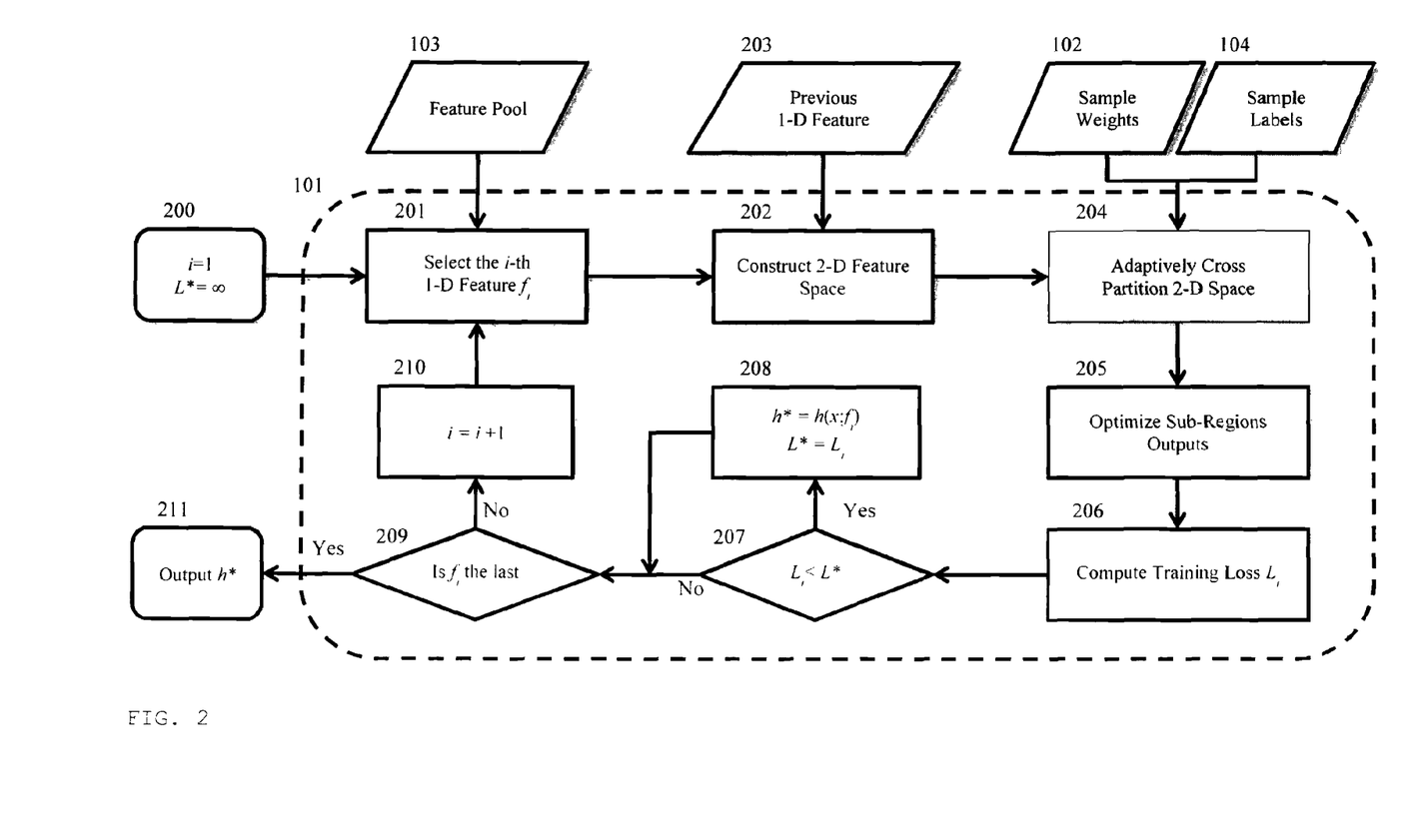
FIG. 2 shows an exemplary method used to learn a non-parametric weak classifier with an Adaptive Cross Partition.

The boosting process trains a good weak classifier based on training samples and their current weights. Preferably, an Adaptive Cross Partition method is used to learn an effective yet efficient non-parametric weak classifier as shown in FIG. 2.

The weak learning process tries to select each feature $f_i$ 201 from the predefined feature pool 103, and combines the selected feature with the feature determined by previous weak classifier 203 if existing so as to construct a 2-D feature space 202, which is partitioned into a set of sub-regions by Adaptive Cross Partition method 204 according to training samples labels 104 and their current weights 102.

Based on the partition, optimal prediction results are given 205 as outputs of the weak classifier h(x:f$_j$). This learned weak classifier is evaluated in terms of its training loss L$_i$ 206 defined by the boosting process, and only the feature and its corresponding weak classifier that minimizes this value are chosen to be the learning result 211.

Figure 3A:
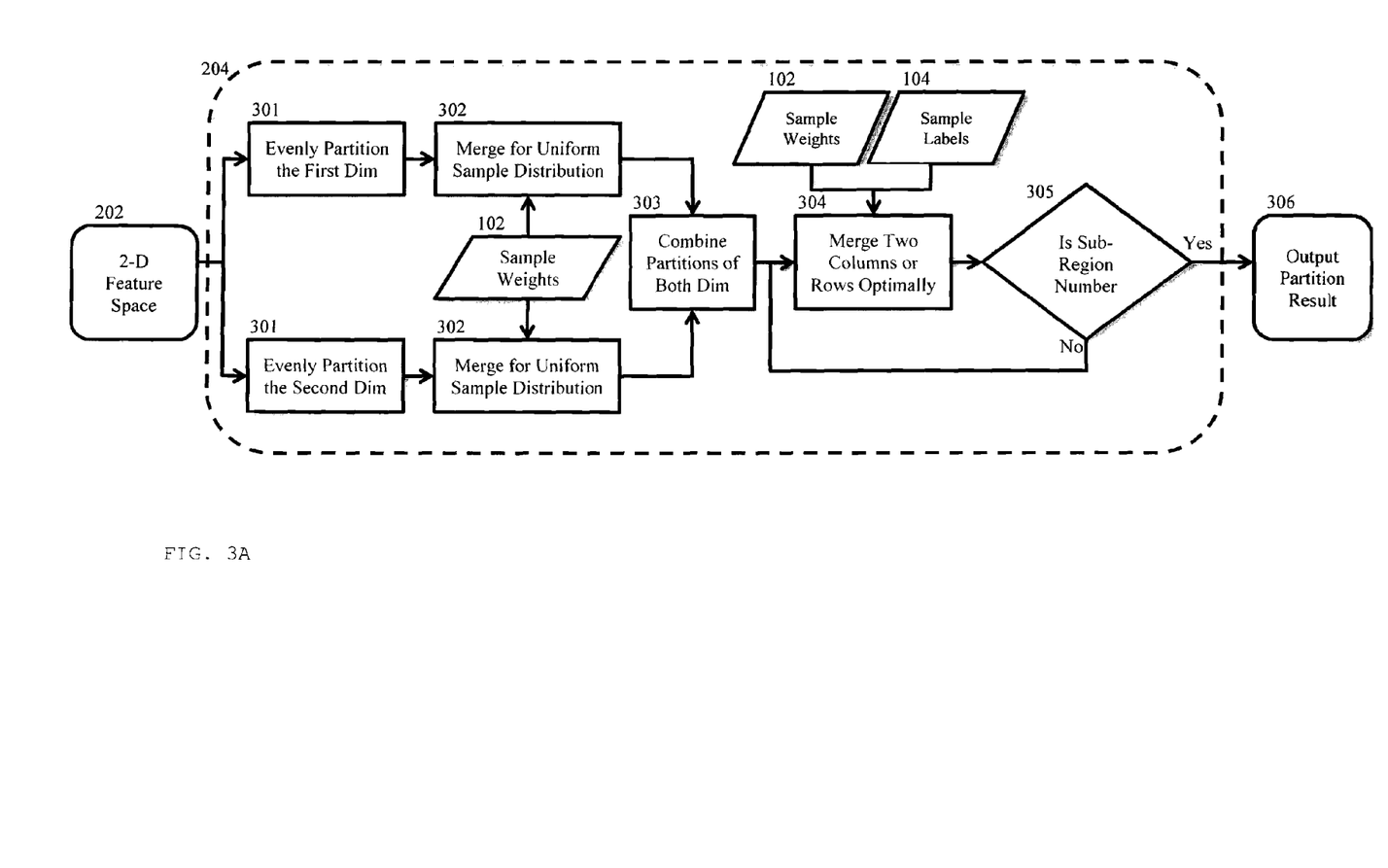
FIG. 3A shows an exemplary processing pipeline for the Adaptive Cross Partition.
Figure 3B:
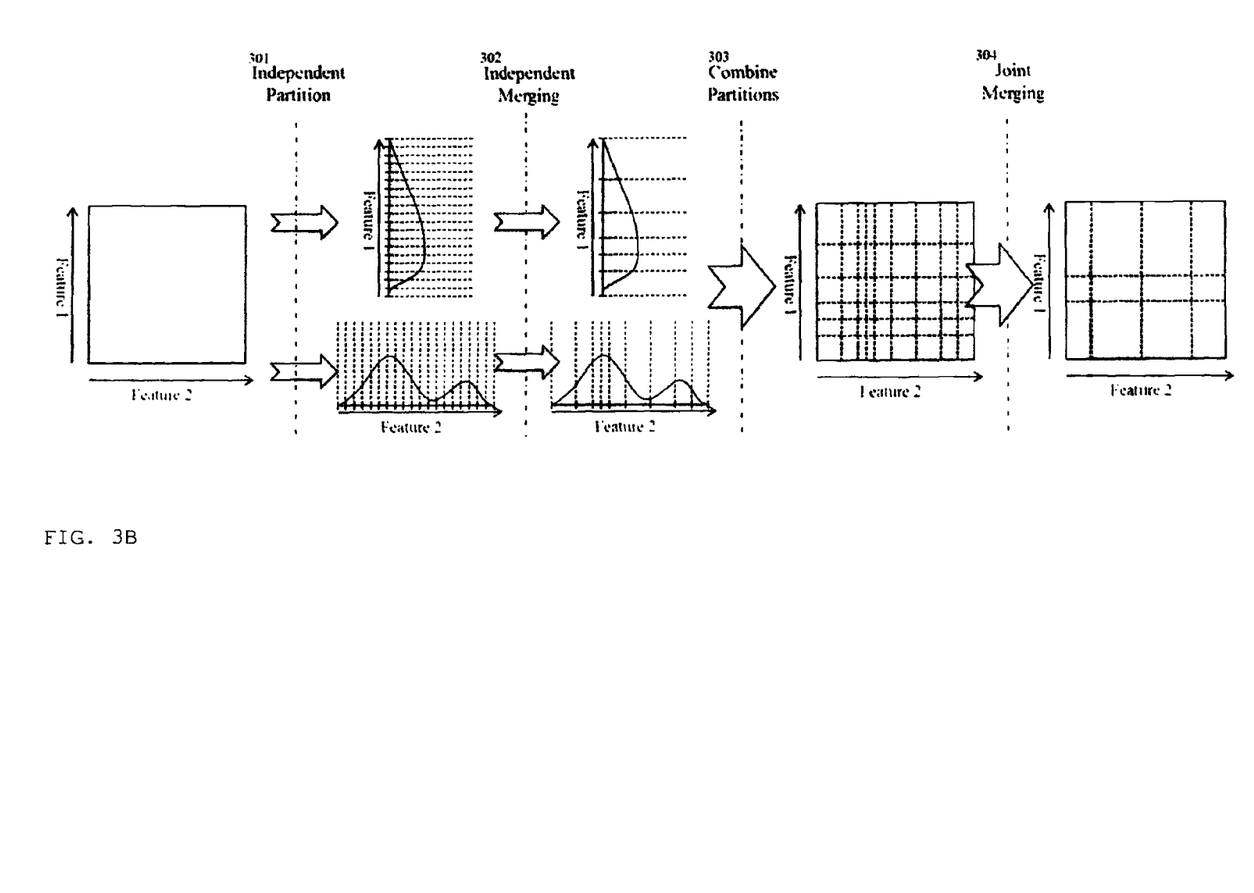
FIG. 3B shows an exemplary illustration of the Adaptive Cross Partition of a 2D feature space.

An exemplary pipeline of Adaptive Cross Partition (ACP) method 204 is shown in the upper part of FIG. 3A while the ACP process is shown in FIG. 3B. The process consists of four steps:

1) Independent partition 301: given a 2-D feature space, each dimension, independently of each other, is evenly divided into a large number of sub-regions of equal width.
2) Independent merging 302: based on the distribution of weighted samples 102, neighboring sub-regions are merged to generate a new partition which has approximately uniform distribution of all training samples.
3) Combine partition 303: a cross partition of the 2D space is achieved by simply combining the independent partitions of both dimensions.
4) Joint Merging 304: neighboring columns or rows are gradually merged together to shrink the number of sub-regions while maintaining good discriminability of the consequent cross partition. Formally, the objective is to find a partition θ that maximize the Bhattacharyya distance $$Bha(\theta) = \sum_j \sqrt{W_j^+ W_j^-}$$

where $$W_j^b = \sum_{k:y_k=b, \theta(x_k)=j} w_k$$

is the sum of weights of training samples of category b falling to the j-th sub-region (b=±1). This process repeats until the sub-region number is lower than a preset threshold 305.

Step 1 produces a large number of sub-regions (typically around 10,000). Step 2 is essentially an unsupervised learning process that only takes sample distribution into consideration and ignores the category information (i.e., labels of training samples).

Step 2 guarantees each sub-region has moderate distribution of training samples. Even if only around 100 sub-regions remain on each dimension after Step 2, the number of sub-regions by cross partition in Step 3 is still formidable (10,000), and the weak classifier based on this cross partition could seriously suffer from overfitting on the training data.

Therefore, Step 4 is used to progressively merge rows or columns of the 2-D cross partition to have an appropriate number of sub-regions, which is guided by maximizing the Bhattacharyya distance between different categories. This merging step is different from Step 2 in two aspects: Step 4 merges both dimensions jointly while Step 2 merges separately; Step 4 actually is a supervised learning process that makes use of category information and tries to achieve as higher discriminability as possible, which is not involved in Step 2.

Figure 4:
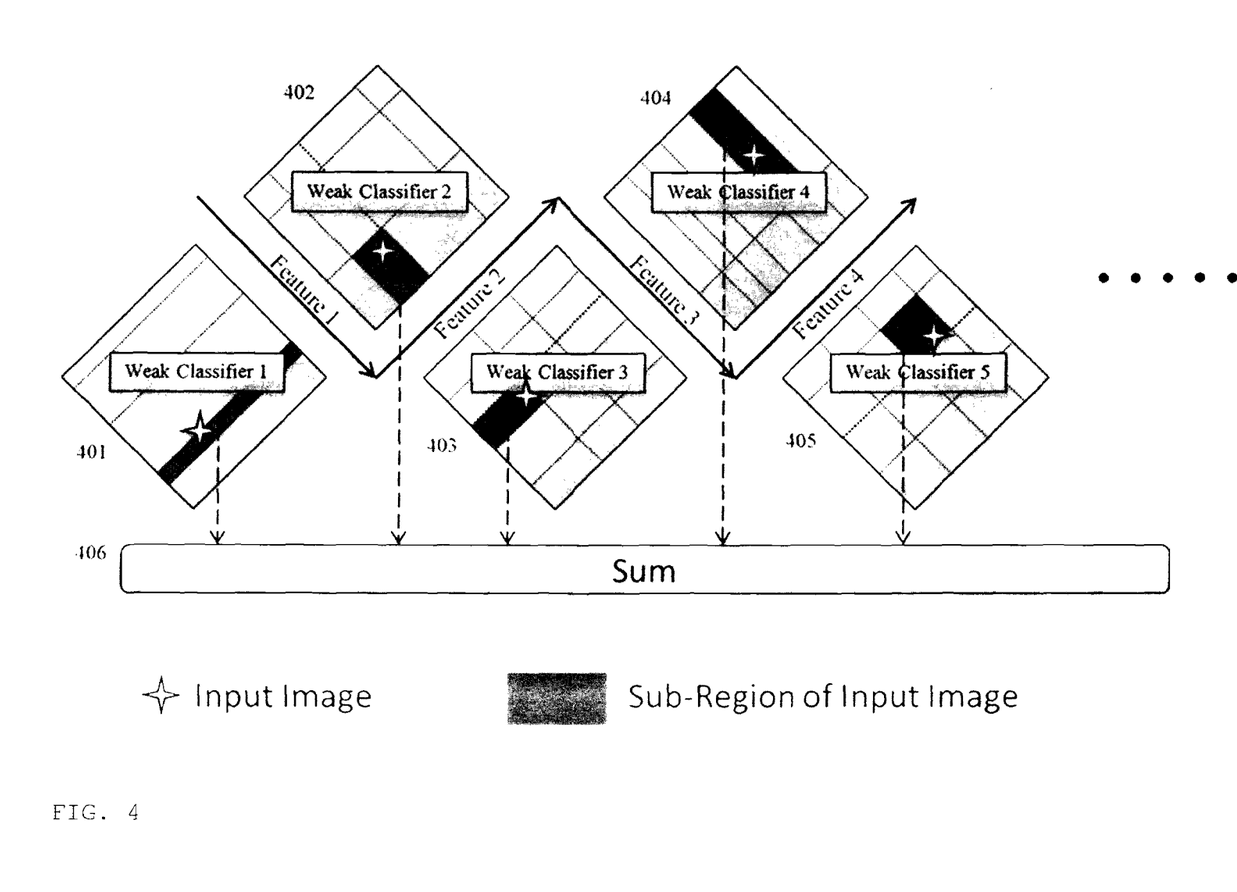
FIG. 4 shows an exemplary classification procedure of an input image.

FIG. 4 illustrates the procedure of using the learned strong classifier to classify an input image. Through feature extraction of all selected features, the input image is projected into the 2-D feature space of each weak classifier (402, 403, 404, 405, . . .) except the first one (401) that contains a single feature. Each weak classifier outputs its own prediction result according to the sub-region the input image falls into, which is obtained by the Adaptive Cross Partition method. These outputs are accumulated 406 through all weak classifiers to provide a highly accurate classification result. In this embodiment, every computed feature except the first one is shared by two consecutive weak classifiers.

Figure 5:
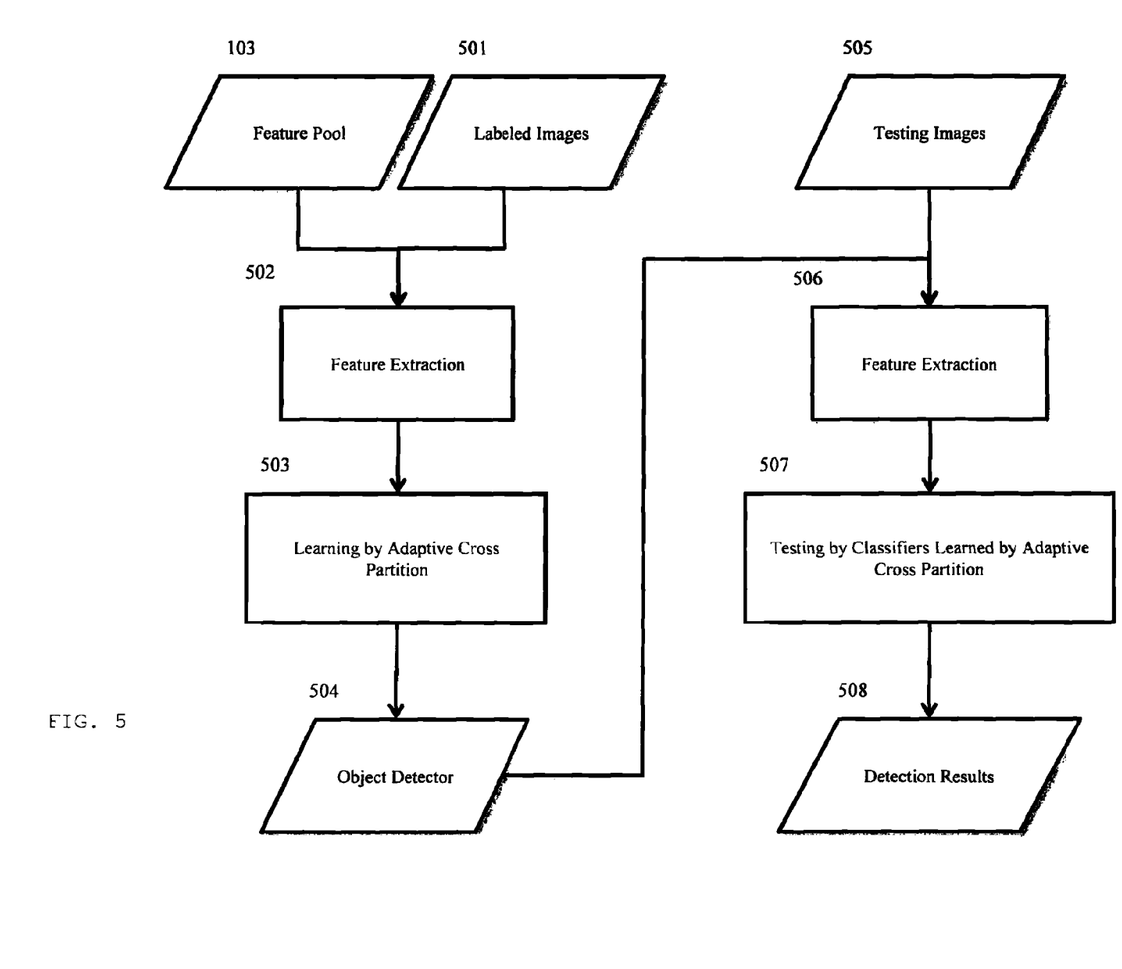
FIG. 5 shows a framework for learning based object detection.

FIG. 5 depicts the whole framework of object detection by learning. During the offline learning process, large quantities of 1-D features are extracted 502 from labeled images 501 (i.e., object of interest or background) by a predefined feature pool 103 (e.g., Histogram of Gradient or Haar-like rectangular features). These data are fed into the boosting process 503 (FIG. 1) that makes use of the weak learning (FIG. 2) based on Adaptive Cross Partition method (FIG. 3) to learn a series of weak classifiers, which are combined into a strong classifier as the object detector 504. Once the detector is learned, it can be employed to detect 507 testing images 506 (FIG. 4) so as to give detection results 508 of objects of interest.

Figure 6:
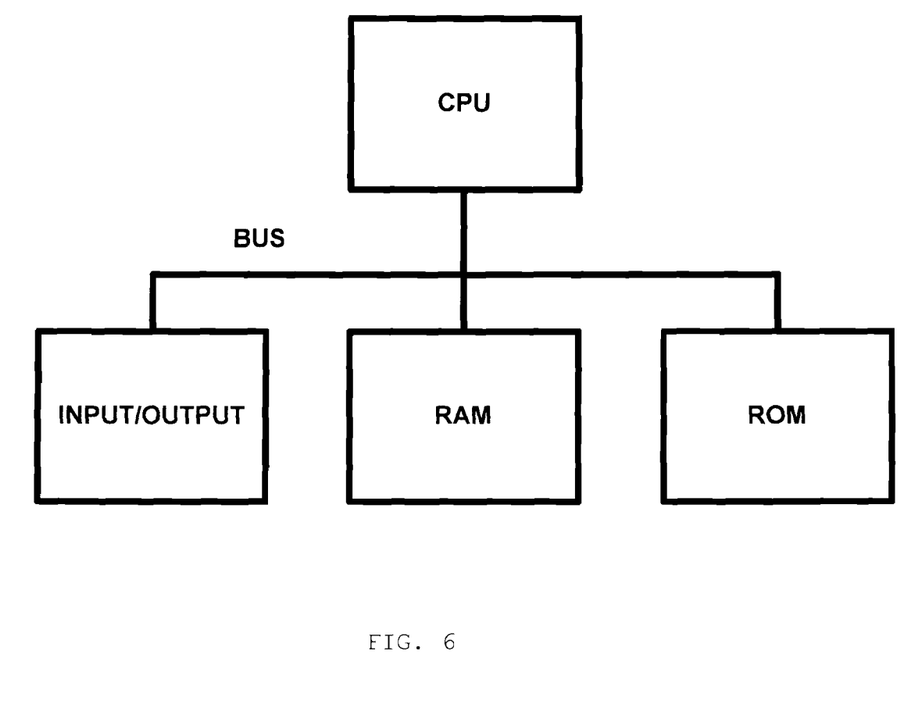
FIG. 6 shows an exemplary system to perform object detection.

FIG. 6 shows an exemplary computer system for managing smart-grid power. While various embodiments of the present invention have been described above, should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. A process to perform object detection for images from an image sensor, comprising:
   reusing a 1-dimensional feature from a previously learned weak classifier and selecting a new feature to construct a 2-dimensional feature space; and
   cross partitioning the 2-dimensional space to learn optimal outputs for instances in each domain within a boosting framework;
   further comprising aggregating the small block-wise regions into larger ones across both dimensions with discriminability; and learning optimal outputs for instances in each block-wise area independently for a boosting operation.

2. The process of claim 1, further comprising performing independent merging and joint merging that adapt to a distribution change from different perspectives.

3. The process of claim 2, wherein the independent merging is unsupervised and the joint merging is supervised.

4. The process of claim 1, further comprising sharing features between neighboring weak classifiers to improve computational efficiency.

5. The process of claim 1, wherein the small block-wise regions have uniform distribution of training samples weighted by the boosting operation.

6. The process of claim 1, further comprising performing independent partitioning on a 2-D feature space, each dimension, independently of each other, is evenly divided into a large number of sub-regions of equal width.

7. The process of claim 1, further comprising performing independent merging where neighboring sub-regions are merged to generate a new partition with approximately uniform distribution of training samples.

8. The process of claim 1, further comprising joint merging of neighboring columns or rows to shrink the number of sub-regions while maintaining good discriminability of consequent cross partition.

9. The process of claim 1, further comprising determining a partition θ that maximizes a Bhattacharyya distance $$Bha(\theta) = \sum_j \sqrt{W_j^+ W_j^-}$$

where $$W_j^b = \sum_{k: y_k = b, \theta(x_k) = j} w_k$$

is the sum of weights of training samples of category b falling to a j-th sub-region (b=±1).

10. A system to perform object detection for images from an image sensor, comprising:
    means for reusing a 1-dimensional feature from a previously learned weak classifier and selecting a new feature to construct a 2-dimensional feature space;
    means for cross partitioning the 2-dimensional space to obtain a number of small block-wise regions with uneven width or height and approximately uniform distribution of training samples;
    means for aggregating the small block-wise regions into larger ones across both dimensions with discriminability; and
    means for learning optimal outputs for instances in each block-wise area independently for a boosting operation.

11. The system of claim 10, further comprising means for performing independent merging and joint merging that adapt to a distribution change from different perspectives.

12. The system of claim 11, wherein the independent merging is unsupervised and the joint merging is supervised.

13. The system of claim 10, further comprising means for sharing features between neighboring weak classifiers to improve computational efficiency.

14. The system of claim 10, wherein the small block-wise regions have uniform distribution of training samples weighted by the boosting operation.

15. The system of claim 10, further comprising means for performing independent partitioning on a 2-D feature space, each dimension, independently of each other, is evenly divided into a large number of sub-regions of equal width.

16. The system of claim 10, further comprising means for performing independent merging where neighboring sub-regions are merged to generate a new partition with approximately uniform distribution of training samples.

17. The system of claim 10, further comprising means for combining independent partitions of a plurality of dimensions to achieve a cross partition of the 2-dimensional space.

18. The system of claim 10, further comprising means for joint merging of neighboring columns or rows to shrink the number of sub-regions while maintaining good discriminability of consequent cross partition.

19. The system of claim 10, further comprising means for determining a partition $\theta$ that maximizes a Bhattacharyya distance $$Bha(\theta) = \sum_j \sqrt{W_j^+ W_j^-}$$

where $$W_j^b = \sum_{k: y_k = b, \theta(x_k) = j} w_k$$

is the sum of weights of training samples of category b falling to a j-th sub-region ($b = \pm 1$).

* * * * *